US006907445B2

(12) United States Patent
Pellegrino et al.

(10) Patent No.: US 6,907,445 B2
(45) Date of Patent: Jun. 14, 2005

(54) CONSISTENT APPLICATION PROGRAMMING INTERFACE FOR COMMUNICATING WITH DISPARATE VEHICLE NETWORK CLASSES

(75) Inventors: Michael J. Pellegrino, Fort Wayne, IN (US); Michael R. Sevcovic, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 847 days.

(21) Appl. No.: 09/781,928

(22) Filed: Feb. 12, 2001

(65) Prior Publication Data

US 2002/0161820 A1 Oct. 31, 2002

(51) Int. Cl.[7] ................. G06F 15/16; G06F 19/00; G05D 1/00
(52) U.S. Cl. ................. 709/201; 709/217; 701/1; 701/29
(58) Field of Search ................. 709/201, 217, 709/200, 203, 208, 250, 230; 701/1, 29

(56) References Cited

U.S. PATENT DOCUMENTS

| | | | | |
|---|---|---|---|---|
| 5,341,478 A | * | 8/1994 | Travis et al. | 709/203 |
| 5,742,848 A | | 4/1998 | Burgess | |
| 6,170,025 B1 | * | 1/2001 | Drottar et al. | 709/201 |
| 6,233,611 B1 | * | 5/2001 | Ludtke et al. | 709/223 |
| 6,449,541 B1 | * | 9/2002 | Goldberg et al. | 701/1 |
| 6,526,340 B1 | * | 2/2003 | Reul et al. | 701/29 |
| 6,571,140 B1 | * | 5/2003 | Wewalaarachchi et al. | 709/203 |
| 6,718,425 B1 | * | 4/2004 | Pajakowski et al. | 710/315 |

OTHER PUBLICATIONS

Sara Williams and Charlie Kindel, The Component Object Model: A Technical Overview, Oct. 1994, Developer Relations Group, Microsoft Corporation.*
Sara Williams and Charlie Kindel, The Component Object Model: A Technical Overview, Dr. Dobb's JournelDec., 1994, 17 pages newsstand special edition, CMP Media Inc, United News and Media Co.

* cited by examiner

*Primary Examiner*—Zarni Maung
(74) *Attorney, Agent, or Firm*—Jeffrey P. Calfa; Dennis Kelly Sullivan; Susan L. Lukasik

(57) ABSTRACT

A computer implemented translation system provides a programming interface between a client and remote devices connected to a vehicle data network. The translation system presents programmers with a uniform abstraction of vehicle networks that permits programming and diagnostic procedures to be carried out without reference by the programmer to nuances of the particular network class used on the motor vehicle. Three major interfaces are defined to implement the invention. A network interface incorporates a plurality of functions representing a model of a physical network. A data link interface responsive to client requests for acquiring a network instance corresponding to a physical network from the network interface. The establishment of a network instance may involve reference to a database to obtain appropriate drivers for the underlying physical network represented by the network instance. A remote device interface incorporates a plurality of functions representing the physical devices callable through the network interface and handles messaging between the client and a physical device attached to the underlying physical network.

21 Claims, 3 Drawing Sheets

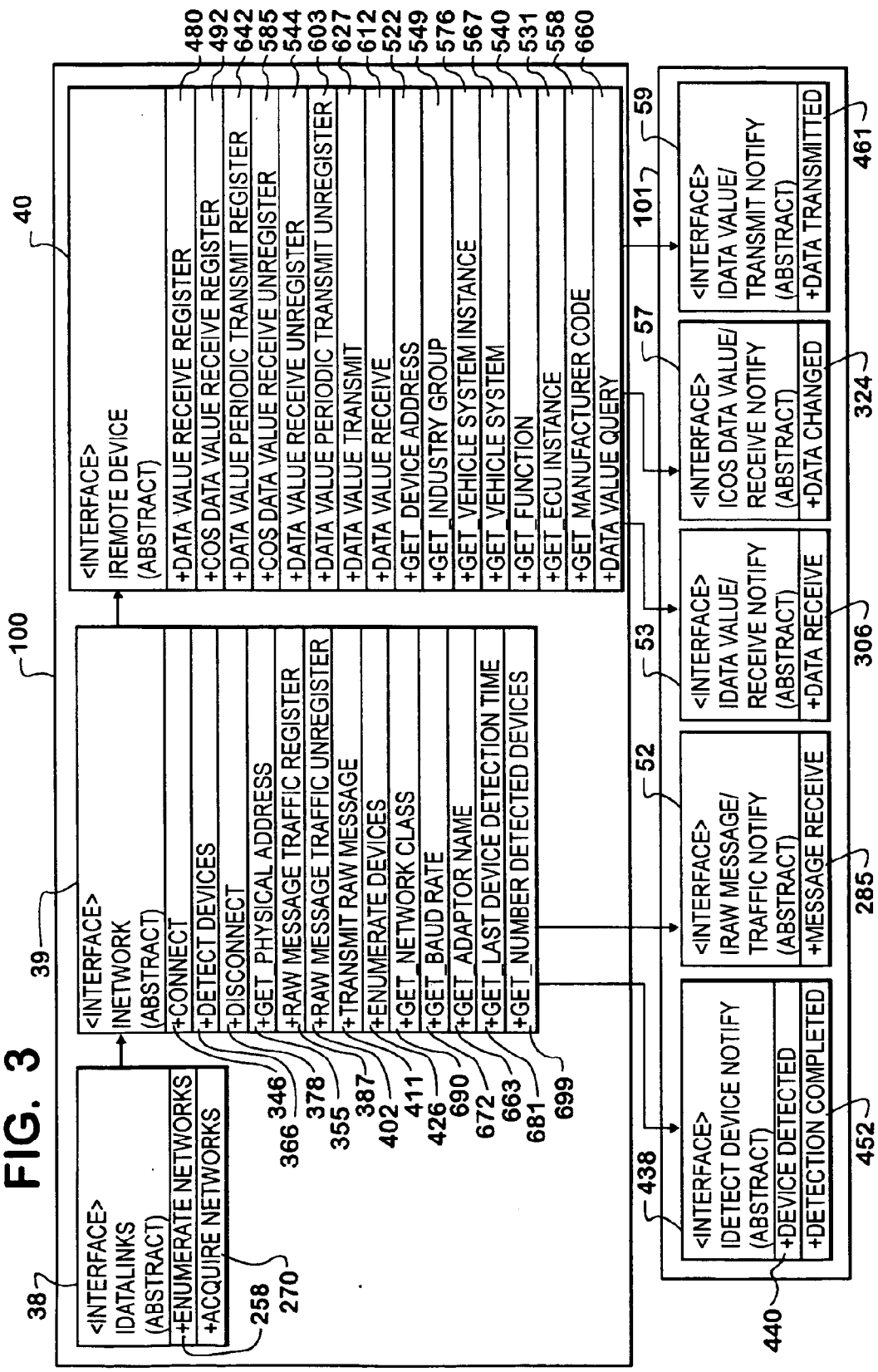

CONSISTENT APPLICATION PROGRAMMING INTERFACE FOR COMMUNICATING WITH DISPARATE VEHICLE NETWORK CLASSES

FIELD OF THE INVENTION

The present invention relates to vehicle communication networks and more particularly relates to providing an application programming interface which presents to programmers a common model covering a plurality of vehicle network classes.

DESCRIPTION OF THE PRIOR ART

Contemporary designs for the control and management of vehicle components increasingly rely on computer networking. Digital data is exchanged between component controllers over a common physical layer such as a twisted shielded pair of wires. Intelligible communication between two or more device controllers among a greater plurality of devices, all occurring over the common physical layer, depends upon the communicating devices being able to discriminate among messages they receive and respond to those messages directed to them. Such methods are well known in the art and are part of the standards which the Society of Automotive Engineers (SAE) has published and continues to publish as part of the SAE J1939 and the SAE J1587 protocols.

The J1939 protocol provides an open protocol and a definition of the performance requirements of the medium of the physical layer, but also allows for development of proprietary protocols. The SAE J1939 protocol is a specialized application of a controller area network (CAN) and may be readily implemented utilizing commercial integrated circuits such as the C167 Integrated Circuit manufactured by Siemens of Germany.

The CAN protocol is an ISO standard (ISO 11898) for serial data communication, particularly aimed at automotive applications. The CAN standard includes a physical layer (including the data bus) and a data-link layer, which define a few different message types, arbitration rules for bus access and methods for fault detection and fault confinement. The physical layer uses differential transmission on a twisted pair wire bus. A non-destructive bitwise arbitration is used to control access to the bus. Messages are small, at most eight bytes, and are protected by checksum error detection. Each message carries a numeric value which controls its priority on the bus, and may also serve as an identification of the contents of the message. CAN offers an error handling scheme that results in retransmitted messages when they are not properly received. CAN also provides means for removing faulty nodes from the bus. CAN further adds the capability of supporting what are termed "higher layer protocols" for standardizing startup procedures including bit rate setting, distributing addresses among participating nodes or kinds of messages, determining the layout of the messages and routines for error handling on the system level.

The SAE J1587 protocol relates to data exchange between microcomputers in heavy duty vehicle applications. The protocol defines formats for message and data, including field description, size, scale, internal data representation and position within a message. Guidelines for message transmission frequency and circumstances are provided. Message formats are to be published for information pertaining to vehicle operation and vehicle component performance, diagnostic and maintenance data, among other things. The protocol is used in conjunction with the SAE J1708, which defines requirements for hardware.

Digital data communications over serial data paths are an effective technique for reducing the number of dedicated communication paths between the numerous switches, sensors, devices and gauges installed on the vehicles. Multiplexing the signals to and from local controllers and switches promises greater physical simplicity through displacing much of the vehicle wiring harness, reducing manufacturing costs, facilitating vehicle electrical load management, and enhancing system reliability.

It is by no means clear that the two published standards will prove to be the universe of possible network protocols for vehicles. Indeed both standards provide for proprietary extensions to the protocols. The existence of more than one protocol complicates the work of programmers. Commonly, a separate programming interface for each class of vehicle network has been provided. Programmers have been required to know the details of the network protocol in order to program vehicle class networks. For example, a programmer has been required to know the details of network message formats and message structure. This forces programmers to spend time on nuances of network operation rather than applying a focused effort to programming related to vehicle operation. Generalized programming interfaces, for example, RP1210 and OPC have proved either too general or too poor in performance terms, and have lacked mechanisms for handling data in a consistent manner on all classes of networks.

Software development can be greatly aided by increasing the level of abstraction at which the programmer works. Increasing abstraction in a programming environment should be based on increasing independence from any one programming language or platform and allow sharing of fundamental components between programs. The flexibility and adaptability of such a system are enhanced by making the system extendible, which allows for evolution of the system and by providing a high level of robustness.

One system proposed meeting many of these criteria is the Microsoft Component Object Model (COM). COM provides a foundation for higher-level software services, which may be presented to a programmer at a high level of abstraction. COM provides mechanisms for communications between components, even across process and network boundaries, error and status reporting and for dynamic loading of components. Qualification of a software or data model or object as a COM component requires meeting certain interface design rules.

A programmer working in a COM environment is able to exploit a binary standard for function calling between components and to use common interfaces for strongly typed groups of functions. COM provides a base interface which allows components to dynamically discover the interfaces implemented by other components (through qualification) and which further provides reference counting to allow components to track their own lifetime and to delete themselves. See *The Component Object Model: A Technical Overview*, Williams, Sara & Kindel, Charles (1994).

SUMMARY OF THE INVENTION

According to the invention there is provided a computer implemented translation system between a client and remote devices connected to a vehicle data network. The translation system presents programmers with a uniform abstraction of vehicle networks that permits programming and diagnostic procedures to be carried out without reference by the programmer to nuances of the particular network class used on the motor vehicle. As a result, a programmer works with any vehicle network through a common interface. Three major interfaces are defined to implement the invention. A network interface incorporates a plurality of functions representing a model of a physical network. A data link interface responsive to client requests for acquiring a network instance corresponding to a physical network from the network interface. The establishment of a network instance may involve reference to a database to obtain appropriate drivers for the underlying physical network represented by the network instance. A remote device interface incorporates a plurality of functions representing the physical devices callable through the network interface and handles messaging between the client and a physical device attached to the underlying physical network.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is an interface specification provided by the invention.

DETAILED DESCRIPTION OF THE INVENTION

Environment

Figure 1:
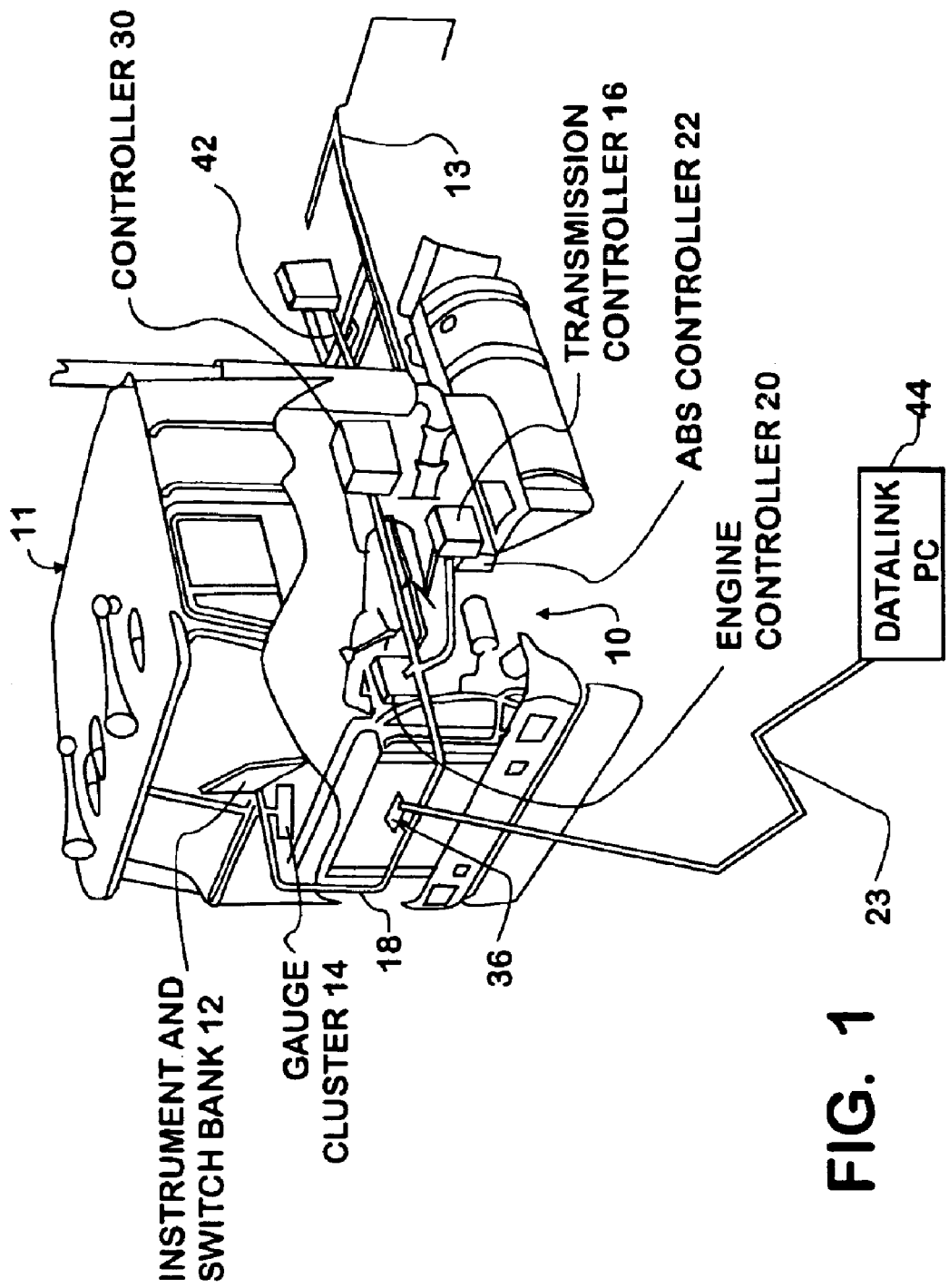
FIG. 1 is an illustration of a vehicle electrical system in a perspective, partial cutaway view of a truck.

FIG. 1 is a perspective view of a vehicle 11 and of an electrical control system 10 installed on the vehicle and vehicle chassis 13. Vehicle electrical system 10 comprises a network which may, in one embodiment, comprise a twisted pair (either shielded or unshielded) cable operating as a serial data bus 18. One node of bus 18 is a body controller 30, which is a major component of a vehicle electronic control system. Body controller 30 manages a number of vocational controllers connected to bus 18 as nodes. Collectively, bus 18 and the various nodes attached thereto form a controller area network (CAN). Numerous opportunities exist for programming the various controllers. Alternative network classes may be employed.

Active vehicle components are typically controlled by one of a group of autonomous, vocational controllers, which include an instrument and switch bank 12, a gauge cluster 14, an engine controller 20, a transmission controller 16, and an antilock brake system (ABS) controller 22, all of which are connected to body controller 30 over a serial data bus 18 and all of which are connected to bus 18 as nodes. The autonomous controllers include local data processing and programming and are typically supplied by the manufacturer of the controlled component. For each autonomous controller there is a defined set of variables used for communications between the autonomous controller and other data processing components on the network or attached to the network. Bus 18 is preferably a twisted pair cable constructed in accordance with SAE standard J1939 and is externally accessible via a diagnostic port 36. Diagnostic port 36 is typically located under the steering column inside the cab of vehicle 13, but may be located elsewhere. Although the autonomous controllers handle many functions locally and are functionally defined without reference to body controller 30, they may report data to body controller 30 and may receive operational requests from body controller 30. Gauge cluster 14, transmission controller 16 and engine controller 20 all may communicate with body controller 30, which also monitors inputs received from the auxiliary instrument and switch bank 12 over the serial communication link in harness 18. For a CAN system a J1939 compliant cable 23 is connected from port 36 to a remote data link computer 44.

External Hardware Implementation

Figure 2:
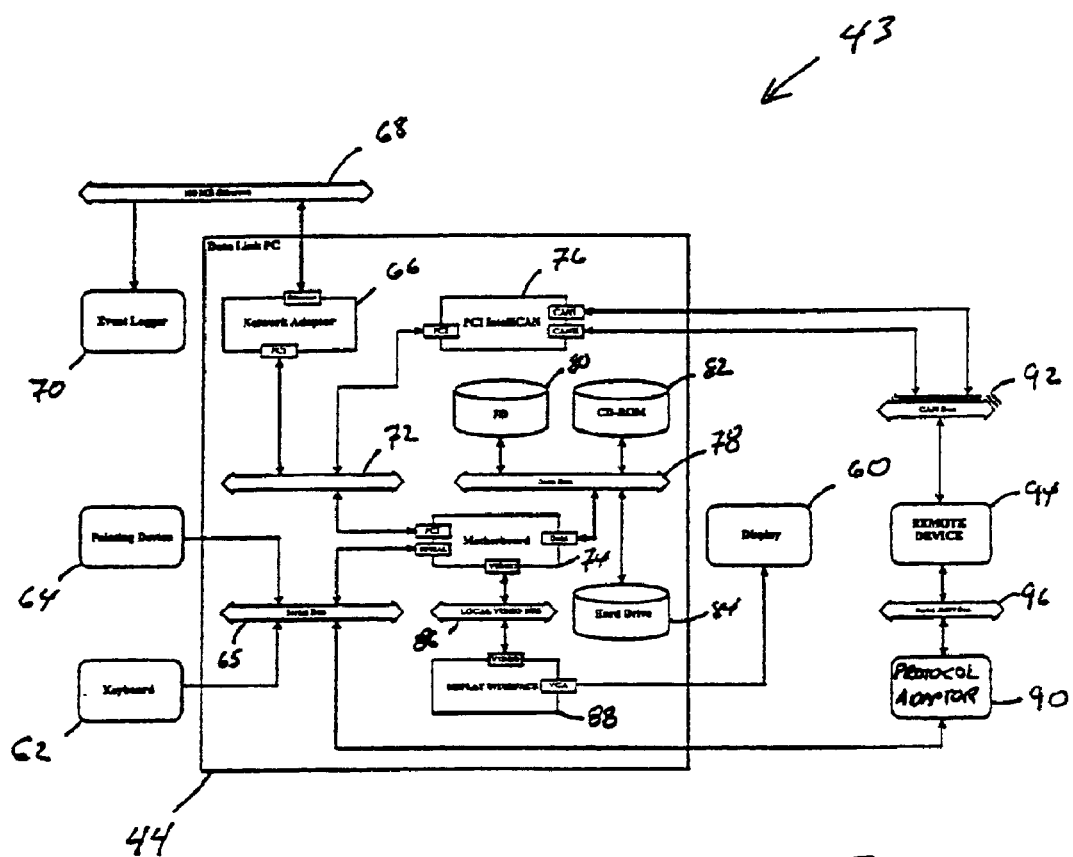
FIG. 2 is a high level block diagram of a computer system used to implement the invention.

FIG. 2 is a block diagram of a data processing system 43 incorporating a data link PC 44. Data link PC 44 is a personal computer of substantially conventional architecture, adapted to communicate with a vehicle network meeting either of the SAE protocols. It is anticipated that any new protocols developed in the future will be as readily handled. Computer 44 is attached to the usual peripheral devices including a display 60, a keyboard 62 and a pointing device 64. Pointing device 64 and keyboard 62 are connected to the computer's serial bus 65 which transmits inputs from those devices to the motherboard in a conventional manner. Computer 44 further includes a PCI bus for the attachment of adapter cards, which include a network adapter 66 and a PCI to CAN adapter card 76. The network adapter 66 allows connection via an external ethernet 68 to other data processing equipment such as an event logger 70. Adapter card 76 allows two connections to a vehicle CAN bus 92 over which communication may be maintained to a remote device 94. Alternatively, remote device 94 may be connected by an SAE J1587 bus 96 to a port adapter 90 allowing communication between the remote device 94 and computer 44 through the computer's serial bus 65. Such communication would occur over a conventional personal computer serial port. Motherboard 72 includes a special data bus 78 for communication with a floppy drive 80 a CD Rom 82 and a hard drive 84 and controls the display 60 over a local video bus 86 and display interface 88. Remote data link personal computer 44 executes data link software package 100 described below to allow programmer interaction with remote device 94 attached to a motor vehicle network.

Software Systems

FIG. 3 illustrates the component object model and interface design provided by a data link software package 100 of the invention. Software package 100 incorporates three COM interfaces through which a programmer may program or evaluate a vehicle network at an abstract level. Package 100 provides translation of a message moving between client and devices across a network boundary, relieving the programmer of concern for the details of specific network messaging. COM interfaces 38, 39 and 40 represent the highest level of abstraction of the system and, while believed by the present inventors to be a particularly convenient and logical way of presenting underlying systems, do not exhaust the possibilities for high level re-presentation. All COM interfaces must implement the interface for a root COM component+/Unknown. Every interface must have a unique interface identification (IID). An interface, once assigned an IID and published, becomes unmutable. Interface member functions should have a return type of HResult to allow reporting of remote procedure call (RPC) errors. String parameters in interface member functions should be in Unicode. Extensive descriptions of the Component Object Model are available from the Microsoft Online Library on the World Wide Web.

The IDataLink Interface

An IDataLink interface 38 provides the starting point for clients access to the functionality provided by the data link software package 100. It provides a mechanism for acquiring network interface instances corresponding to a physical network. Interface 38 further provides for the enumeration of those networks that have already been acquired. IDataLink interface 38 includes two functions. One function is an "Acquire Network" function 270. Function 270 returns an instance of an INetwork interface 39. The INetwork interface 39 provides the gateway to a physical network in general, and particular devices connected to the physical network. The name and instance number of a physical network are concatenated to generate a unique name that is used to refer to the given network. Multiple calls to acquire network with the same name return an INetwork pointer that points to the same underlying physical network. An example of a network name/instance number concatenation where a CAN network is installed on a vehicle is:

Name=*I+ME* PCI-IntelliCAN 1

The name is thereafter used to acquire additional network configuration data stored in the WIN32 registry. Entries within the WIN32 registry tell the software all the details of how to connect to the underlying physical network, e.g., which ports to listen on, which channel, etc. A cookie is implied by software returning a valid INetwork interface pointer to a COM object that represents an underlying network.

The Acquire Network function 270 specifies three variables. The variables are denoted "Name", "Instance" and "Network". Name is the name of a hardware device that will represent a physical connection between the data link computer 44 and the SAE standard network installed on a vehicle. At present there are two SAE published standards, and the variable can assume one of two values: (1) "Dearborn protocol adapter" a value which implies the network shall be operating via physical connection to a Dearborn group DPA's II J1708 network interface (which is specific type of circuit board); and (2) "I+ME PCI-IntelliCAN" a value which implies that a network shall be operating via physical connection to a network utilizing the J1939 protocol (CAN). Should additional network protocols be defined, more allowed values may be added to software package 100. The variable "Instance" refers to physical interfaces within a machine. An instance number is then used to pick up any additional configuration data needed to utilize a network interface. The variable "Network" is an INetwork object that is returned to a client. The client will then use this object to communicate with the network.

The function _Enumerate Networks_ 258 is used by clients to enumerate all physical networks, typically vehicle networks, that are currently available. A network is defined as available if an instance for the physical network has been created using the Acquire Network function 270. The client specifies a count of the number of INetwork pointers for which it is allocated storage. The data link software 100 then places as many enumerated networks into the network's array as possible. If there is insufficient storage, then the software returns only the count number of networks the client initially specified. Otherwise all networks that have been acquired are returned. When an acquired network is not called at all for an operating cycle, then count and networks return values are undefined and the HResult return code is set for fail. The return values for this function indicate success, a general failure that is a count or network's pointer, and a value for when no networks are successfully acquired. The variables include a count variable which is the number of networks that are in a set of networks returned to the client. Here the client specifies in a call the number of available network pointers in the network's variable. The client then receives the number of networks enumerated in this variable when the call returns. The second variable is the _networks_variable, which is a pointer to an array of INetwork object pointers that describe the networks of which the data link software package 100 is currently aware.

INetwork Interface

A second interface is the INetwork interface 39. The INetwork interface 39 is a generalized software model of physical networks. Interface 39 provides data link interface clients with a way of communicating with a specific network. The data link software 100 performs the network's specific network connection per the network class that the user requests detection upon. This includes loading any proprietary network drivers and initializing them. If there are any start-up procedures that a device may need to perform to become an active member of the network (e.g., perform an address claim procedure on a J1939 network), then the Connect function 346 performs this operation. The Connect function 346 has no variables.

The Detect Device function 366 allows clients to detect devices on a physical network. Clients must perform a detection before they can communicate with a device in a network independent way. Detection on a given network occurs only once for a given platform. Additional data link clients can perform a device enumeration to get the proper references to available network devices. The variables for the Detect Device function 366 include "Notify Call Back", which is a call back pointer that the software uses to notify a client that a given device has been detected. This value must contain a COM object that implements the IDetectNotify interface 438. If the value does not return a COM object, then an error value is returned to the client. If a bad pointer value for the variable is passed, another error value is returned. A second variable for this function is a cookie which allows a client to effectively match a detection notification to an original detection request.

The "Disconnect" function 378 disconnects data link software 100 from the network. This step includes assuring failure of all future network requests as well as a disconnection of the network hardware and an unloading of any network drivers. No variables are required for this function.

An Enumerate Device function 426 is used to return the set of all devices that were detected the last time a detection occurred over the network. If there are no other remote devices on the network, then the set contains only the software's representation on the network. Variables for this operation include a Count variable which is the number of IRemoteDevice objects that are in the set of devices returned to the client. The client specifies on the call the number of available device pointers in the device less the number of variables. The client then receives the number of devices enumerated in this variable when the call returns. A device list variable is an array of IRemoteDevice objects that have been detected since the last network detection.

The "get_AdapterName" function 663 returns the adapter name of the underlying network. Its functional name is such that it can be used as a COM property or a function name. The only variable for this function is "adapter name" which is a storage place for the adapter name of the network represented by this object when returned to the client.

The "get_BaudRate" function 672 returns the operational baud rate of the underlying network. Its functional name is such that it can be used as a COM property or a function name. This whole variable for this function is "baud rate", a storage place for the baud rate of a network represented by this object.

The __get_LastDeviceDetectionTime__function 681 returns the last time a device detection was performed on the underlying network. Its functional name is such that it can be used as a COM property or a function name. The sole variable for this function is the __last detection time__, a storage place for the last detection time of the network.

The "get_NetworkClass" function 690 returns the network class (e.g., J1939, J1587) of the underlying network. Again the function name can be used as a COM property or a function name. A variable for providing a storage place for the network class type of a network is provided.

The "get_NumberDetectedDevice" function 699 returns the number of devices detected the last time the DetectDevices function 366 was performed on the underlying network. Again the functional name is such that it can be used as a COM property or a function name. Variable "number of detected devices" is a storage place for the number of detected devices on the network.

The "RawMessageTrafficRegister" function 387 is used by clients to request all or a subset of message traffic that is transmitted on the network. The client specifies a filter if they want only certain data. Alternatively clients can also run in an unfiltered mode, receiving notifications when any message is transmitted on the network. A filter is not a filter mask, so if a given data link software client wishes to register for a set of messages within a range of values, they need to register each raw message separately. The same client can register for raw message multiple times with the same call back. In this case the client would be notified each time a message matched the client's filter criteria and if the client registered twice for the same message header then the client would be notified twice for each message received from the network.

Function 387 includes three variables. The "notify call back" variable is a call back pointer that the software uses to notify a client that a given message has been received that matches the client's filter criteria. This pointer must contain a COM object that implements the IRawMessageTrafficNotify interface 52. If the pointer does not contain the COM object, an invalid argument result is returned to the client. If a bad pointer value for this variable is passed, a pointer error is returned. A filter variable specifies network header message comparisons within a particular range. The client specifies this as a mechanism for filtering out raw messages which are not of interest. A network cookie variable is returned to the client so the client can effectively match a detection notification to the original detect request.

A "RawMessageTrafficUnregister" function 402 is used to cancel a previous registration for raw message traffic using the RawMessageTrafficRegister function 387. The client supplies a cookie given to it by the register call. The software then halts all future notifications for the registered filter criteria. If a client is receiving raw notifications for multiple registrations over the same call back mechanism then the other remaining raw message registrations remain in effect. Only the registration represented by the cookie is invalidated. Variable for this function is the cookie a client received from a previous registration with raw message traffic register.

The "TransmitRawMessage" function 411 is used by data link software clients to send out raw messages on the network. The client is wholly responsible for building the message header and message body, ensuring that it conforms to the protocol of the network and for checking for responses is appropriate. Time outs and message tries are wholly the responsibility of the client transmitting the raw message. Three variables provided for this function include, "header" which is a message header that is to be used when the message is transmitted on the network, "body size" which is the size in bytes of the message body and "body" which is the message itself.

A IRawMessageTrafficNotify interface 52 is one interface of a data traffic management facility 101 used by data link software 100 to notify data link clients that a raw message has been received from a network. This interface is reached through the INetwork 39 interface. Only one function is implemented with this interface, a message received function 285 which is implemented by a data link client and is used by the data link software 100 to call back to clients when raw message traffic that fit the client's criteria is received. Five variables are included within this function including "time stamp", "header", "body size", "body" and "cookie" which is the cookie that was returned to the client when it performed a register for raw message traffic that subsequently triggered operation of this function. The character of each of the remaining variables tracks the names of the variables.

The INetwork interface 39 also communicates with an IDetectDeviceNotify interface 438. Interface 438 is used by the data link software 100 and notify a data link client of the status of network detections. The interface includes two functions including a device detected function 440, used by the data link software to notify the client that a previously commenced device detection has just detected another remote device on the network. This function has two variables, one a cookie, returned to the data link software client when it originally requests a detection commence, and a "remote device" variable which is a representation of the remote device that was detected on the network. The client can use this pointer for further network communications.

A "DetectionCompleted" function 452 is used by data link software 100 to notify a client that a previously commenced device detection has been completed. This gives the client the opportunity to wait until notification arrives before attempting additional network communications because not all devices might be detected as yet. The only variable return with this function is a cookie which is returned to the data link software 100 when it originally detected the detection commence.

IRemote Device Interface

An IRemoteDevice interface 40 is also accessible from the INetwork interface 39. IRemoteDevice interface 40 includes a number of functions relating to receiving data from, and transmitting data to, actual physical devices. The structure of the interface reflects a generalization of a device and allows incorporation of a data base specifying operating parameters for physical devices.

IDataValueReceiveRegister function 480 is used by clients to request a particular data value from a remote device. The data link client specifies the data value that are of interest and a way of being notified by reference to a data base of values. The data link software 100 determines whether the message is broadcast by the remote device. If it is, then then the datalink software 100 notifies the client every time the message is received from the remote device. Otherwise the data link software 100 explicitly requests the data value from the remote device. If a device is unresponsive, then it is up to the data link client to determine this result. The data link software will not interpret the responsiveness of the device because the criteria for a responsive device may vary greatly from data link client to data link client.

DataValueReceiveRegister function 480 has three variables including a data value ID which is an abstract handle that represents the data value that is to be read from the remote device. Viable values for this handle can be found in the Tables. A notify call back variable is a call back pointer that the data link software 100 uses to notify a client that a given data link value has been received. This value must contain a COM object that implements the IDataValueReceiveNotify interface 53. If it does not, then an invalid argument pointer is returned to the client. If a bad pointer value for the variable is passed in, another error value is returned. A cookie is returned to the client so that the client can effectively match a receipt notification to the original request and for unregistration procedures.

A "DataValueReceive" function 612 is used by clients to request a particular data value from a remote device. The data link client specifies the data value that it is interested in. This function call is different from data value receive register in that only one value is read, and it is a synchronous call. This means that the call will not return until the requested data value is received from the remote device, or a time out occurs. The time out value is controlled as a property of the network as defined in a WIN32 registry. The data link software determines whether the message is broadcast by the remote device. If it is, then the software waits for the next time the message is received from the remote device and then returns the data value to the client. Otherwise the data link software explicitly requests the data value from the remote device. When the answer arrives, then the data link software returns to the client with the data value. If the device is unresponsive, then it is up to the data link client to determine this. A device is classified as unresponsive if it displays a prolonged pattern of communication difficulties. Such communication difficulties may include continued time out of data value requests from a given remote device. The data link software will not interpret the responsiveness of the device because the criteria for a responsive device may vary greatly from data link client to data link client. A data link client might determine whether a device is responsive or not by periodically transmitting a message to it. If the periodically transmitted message continually times out for a period of five minutes, then the client may presume that the remote device is off line.

The data status variable reflects whether the data is actually valid or not. If it indicates an error, then the contents of data value are meaningless. Data status is distinctly different from an HResult return value because an HResult return value is used to indicate an operation error in the software whereas the data status variable indicates the status of remote device communications which may be operating correctly, but not returning the desired results.

Three variables are provided for this function including a "data value ID" which is an abstract handle that represents the data value that is to be read from the remote device. Allowable values for this handle may be found in an appendix to this application. The "data value" variable represents the data requested by the client. For example, if the client requested engine speed, then this variable is what contains the engine speed value. If there is a problem with the transmission as indicated by data status, then this value is undefined and should not be interpreted. Finally, a "data status" variable contains the status of network traffic that has generated this data value. If problems occur in obtaining the data value via the network then the data status variable reflects the problem.

A "DataValueReceiveUnregister" function 594 is used to cancel a previous registration for data value notification initiated using data value receive register function 480. The client supplies a cookie given to it by the register call. The data link software then halts all future notifications for the registered filter criteria. If a client is receiving notifications from multiple registrations over the same call back mechanism, then the other remaining data value registrations remain in effect. Only the registration represented by the cookie is invalidated. The cookie is the only variable for this function and is the cookie that the client received from a previous registration with the data value receive register function 480.

A "Change-of-Status(COS)DataValueReceiveRegister" function 492 is used by clients to request a change of state status for a particular data value on a remote device. The data link client specifies the data value that it is interested in and a way of being notified. The data link software 100 determines whether this message is broadcast by the remote device. If it is broadcast, then it notifies the client every time the message is received from the remote device. Otherwise the data link software 100 explicitly requests the data value from the remote device.

Data link software 100 can check data value as it is received from the remote device to ensure that the value does not fall outside of a tolerance range for the value. For example, if a data link client is monitoring a particular data value, it can specify notification if the value changes by 10%. In this case as soon as the data value changes more than 10% from the point of the original request, the client is notified. A number of variables are provided for this function. A data value ID variable is an abstract handle that represents the data value that is to be monitored on the remote device for a state change. A notify call back pointer is used by the data link software to notify a client that a given data link value has changed state. This value must contain a COM object that implements the ICOSDataValueReceiveNotifyinterface 57. If it does not, then an error value is returned to the client. If a bad pointer is passed in another error is returned to the client. Yet another variable is the "state change type" variable. This variable describes the type of the state change that caused the notification. It is an enumeration that will either be state change which means the data is changed or a state constant which means that the data has remained constant, or has remained constant within a given value range. A tolerance variable is a tolerance value for change of data value as a percentage of the first value. Finally, a cookie is returned to the client so that the client can effectively match a change of state notification to an original request for unregistration purposes.

A "COSDataValueReceiveUnregister" function 585 is used to cancel a previous registration for change of state data value notification initiated using the change of state data value receive register function 492. This function is used to cancel a previous registration for change of state data value notification. The client supplies a cookie given to it by the register call. The data link software then halts all future notifications for the registered filtered client criteria.

The DataValueTransmit function 627 is used by clients to send a particular data value to a remote device. The data link client specifies the data value that it is interested in and the data value it wants to send to the device. This call is different from the DataValuePeriodicTransmit-Registerfunction 642 in that only one value is sent, and it is a synchronous call. This means that the call will not return until the requested data value is sent to the remote device, or a time out occurs, The data status variable reflects whether the data transmission actually succeeded or not. The data link software 100 does not validate whether a value is in proper range. The caller is responsible for ensuring that any data value sent is in the proper value range. Variables for this function include data value ID, an abstract handle that represents the data value that is to be written to the remote device. A data value variable that the client requested to transmit to the remote device and a data status variable containing the status of network traffic that occurred with this data value transmit request. If there were any problems in obtaining the data value via the network the data status reflects this.

A DataValuePeriodicTransmitRegister function 642 is used by clients to send a particular data value to a remote device. The data link client specifies the data value in which it is interested and the data value it wants to send to the device. This call differs from data value transmit in that the value is periodically sent to the remote device based on a client's specify time value. This is an asynchronous procedure and means that the call will immediately return to the client. The client shall be notified at a later time of the result of transmissions to the remote device. The variables for this function include a data value ID which is an abstract handle that represents the data value that is to be written to the remote device. A data value variable that the client requested to transmit to the remote device. A timeout rate variable is a value representing the time value to wait in milliseconds for message transmission and an acknowledgment to complete. A transmit period variable indicates the periodic rate at which the software shall broadcast the data value to the remote device.

A DataValuePeriodicTransmitUnregister function 603 is used to cancel a previous registration to periodically transmit a data value using the data value periodic transmit register function. The client supplies a cookie given to it by the register call. The data link software then halts all future notifications for the registered filter criteria. If a client simultaneously receives notifications for multiple registrations over the same call back mechanism, then the other remaining registrations remain in effect. Only the registration represented by the cookie is invalidated.

The "get_DeviceAddress" function 522 returns the physical address or a remote device in the underlying network. Its function name is such that it can be used as a COM property or a function name. This property is read only enforceable because there is no corresponding published "put device address" function that would be used for setting the property externally via the interface. The variable included with this function is the "device address" variable, which is a storage place for the physical address of the remote device represented by this object.

A "get_IndustryGroup" function 549 returns the industry group for a remote device. Its functional name is such that it can be used as a COM property or a function name. The property is read only enforceable because there is no corresponding published put industry group that would be used for setting the property. The variable for this function is industry group which is a storage place for the industry group of the remote device.

A "get_VehicleSystemInstance" function 576 returns the vehicle system instance code of this remote device on the underlying network. Its functional name is such that it can be used as a COM property. This property is read only enforceable because there is no corresponding published put vehicle system instance function used for setting the property. The one variable defined for function 576 is a "vehicle system instance" variable which is the storage place for the vehicle system instance represented by the object.

A _get_VehicleSystem_ function 567 returns the vehicle system code of this remote device on the underlying network. Its functional name is such that it can be used as a COM property or a function name. The property is read only enforceable because there is no corresponding published put vehicle system that would be used for setting the property. One variable providing a storage place for the vehicle system represented by the object is defined for function 567.

A "get_Function" function 540 returns the function code of this remote device. A functional name is such that can be used as a COM property or a function name. The property is read only enforceable. The sole variable for the function is entitled function which is again a storage place for the function code.

A "get_ECUInstance" function 531 returns a ECU instance for this remote device on the underlying network. The "ECU Instance" serves as part of the identification of the underlying device. Its functional name is such that it can be used as a COM property or a function name. The property is read only enforceable. ECU instance is the sole variable for this function which provides the storage place.

A "get_ManufacturerCode" function 558 returns a manufacturer code for a remote device on the underlying network. Its functional name is such that it can be used as a COM property or a function name. This property is read only enforceable because there is no corresponding published put manufacturer code that would be used for setting the property. Manufacturer codes are used for interrogating or querying a data base to obtain for a device values generated by a particular device, such as for an engine control module or anti-lock brake system. Manufacturer code is the only variable used with this function.

Finally a DataValueQuery function 660 provides a return route for placing requested values via variable names specified by the client.

Three interfaces are accessed through IRemoteDevice interface 40. The first of these interfaces is an IDataValueReceiveNotify interface 53 used by the data link software 100 to relate information to data link clients about data values that they are registered for. Only one function, a receive function 306, is provided for this interface and is used by data link software 100 to call back to clients when a data value that the client registered for is received over the network. Four variables are provided with this function including a time stamp, a data value, which may be specified by the manufacturer code, a status variable containing the status of network traffic that generated this data value and a cookie returned to the client when it performed a register for the data value that subsequently generated this function call back. An ICOSDataValueReceiveNotify interface 57 is used by the data link software 100 to relate information about the status of data values when they change state to data link clients that register for this notification. A data changed function 324 is used by the data link software to call back to clients when a data that the client registered for changes its state based on criteria specified by the client. Variables for this function include a time stamp, data value, data status, state status, which describes the type of state change causing the notification. This value is an enumeration that will either be state change which means the data changed or state constant which means the date is continually remaining constant within a tolerance range. A cookie variable is returned to the client when it performed a register for the data value that subsequently generated this function call back.

An IDataValueTransmitNotifyinterface 59 is used by data link software 100 to relate information about the status of data value transmissions to remote devices. A data transmitted function 461 is implemented through this interface to call back to clients when a data value that the client is transmitting has been sent to the network. The variables for this function include a time stamp. Another variable is transmit status which contains the status of network messages at the point of transmission to the network. Any problems in sending the data value are reflected in the field.

Database Support

A data link library or database provides definitions for the data link software 100 when applied to a heavy duty truck application. Clients use compiler mechanisms that need to be aware that they need to scope all data types defined within the data link library. The data link server exposes only one COM object that is externally creatable (i.e., creatable by third party software like data link clients). That COM object is entitled "DataLinks". Data link clients are free to implement whatever COM object they deem suitable for handling their call back mechanism. The data link software requires only that for a given operation, the call back mechanism support a standard interface to call back on. For example, to provide a call back mechanism to the data link software 100 from notification on raw message receipt, the client needs only to provide an interface pointer that implements the IRawMessageTrafficNotify interface 52.

Table 1 draws on a commercial database package, which specifies variable classes for devices used on motor vehicles, for examples of the kind of data the invention can be applied to. The specific product is the Dearborn Group's NASPAK3 product, available from Dearborn Group, 27007 Mills Tech Court, Farmington Hills, Mich. This product is occasionally updated and the values here are used only as an example.

TABLE 1

| Data Value ID | Variable Name | Units | Lower Limit | Upper Limit |
| --- | --- | --- | --- | --- |
| REQUEST_SPEED_OR_SPEED_LIMIT | Request Speed or Speed Limit | rpm | 0 | 8031.875 |
| REQUEST_TORQUE_OR_TORQUE_LIMI | Request Torque or Torque Limit | % | −125 | 125 |
| REQUESTED_PERCENT_CLUTCH_SLIP | Requested percent clutch slip | % gain | 0 | 100 |
| REQUESTED_GEAR | Requested gear | gear value | −125 | 125 |
| SELECTED_GEAR | Selected gear | gear value | −125 | 125 |
| ACTUAL_GEAR_RATIO | Actual gear ratio | no unit | 0 | 64.255 |
| CURRENT_GEAR | Current Gear | gear value (unit less) | −125 | 125 |
| NUMBER_OF_SOFTWARE_IDENTIFICATION_FIELDS | Number of software identification fields | unit less | 0 | 125 |
| WHEEL_BASED_VEHICLE_SPEED | Wheel-based vehicle speed | kph | 0 | 251 |
| CRUISE_CONTROL_SET_SPEED | Cruise control set speed | kph | 0 | 250 |
| ACTUAL_RETARDER_PERCENT_TORQUE | Actual retarder-percent torque | % | −125 | 125 |
| BRAKE_PEDAL_POSITION | Brake pedal position | % gain | 0 | 100 |
| OUTPUT_SHAFT_SPEED | Output shaft speed | rpm | 0 | 8031.875 |
| PERCENT_CLUTCH_SLIP | Percent clutch slip | % | 0 | 100 |
| TOTAL_IDLE_FUEL_USED | Total idle fuel used | L | 0 | 2105540608 |
| TOTAL_IDLE_HOURS | Total idle hours | hrs | 0 | 210554060.75 |
| TURBO-OIL-PRESSURE | Turbo oil pressure | kPa | 0 | 1000 |
| TURBO-SPEED | Turbo speed | rpm | 0 | 257020 |
| AIR_START_PRESS | Air start pressure | kPa | 0 | 1000 |
| NOMINAL_FRICTION_PERCENT_TORQUE | Nominal friction-percent torque | % | −125 | 125 |
| ENGINE_S_DESIRED_OPERATING_SPEED | Engine's desired operating speed | rpm | 0 | 8031.875 |
| ENGINE_S_OPERATING_SPEED_ASYMMETRY_ADJUSTMENT | Engine's operating speed asymmetry | engpw r/ engsp | 0 | 250 |
| TRIP_DISTANCE | Trip distance | km | 0 | 526385151.9 |
| TOTAL_VEHICLE-DISTANCE | Total vehicle distance | km | 0 | 526385151.9 |
| RETARDER_CONTROL_METHOD | Retarder control method | step | 0 | 250 |
| RETARDER_SPEED_AT_IDLE-POINT-1 | Retarder speed at idle, point 1 | rpm | 0 | 8031.875 |
| PERCENT_TORQUE_AT_IDLE_POINT-1 | Percent torque at idle, point 1 | % | −125 | 125 |
| MAXIMUM_RETARDER_SPEED_POINT | Maximum retarder speed | rpm | 0 | 8031.875 |
| PERCENT_TORQUE_AT_MAXIMUM_SPEED_ | Percent torque at maximum | % | −125 | 125 |

TABLE 1-continued

| Data Value ID | Variable Name | Units | Lower Limit | Upper Limit |
|---|---|---|---|---|
| POINT_2 | speed, point 2 | | | |
| RETARDER_SPEED_AT_POINT_3 | Retarder speed at point 3 | rpm | 0 | 8031.875 |
| PERCENT_TORQUE_AT_POINT_3 | Retarder speed at point 3 | % | −125 | 125 |
| RETARDER_SPEED_AT_POINT_4 | Retarder speed at point 4 | rpm | 0 | 8031.875 |
| PERCENT_TORQUE_AT_POINT_4 | Percent torque at point 4 | % | −125 | 125 |
| RETARDER_SPEED_AT_PEAK_TORQUE_POINT-5 | Retarder speed at peak torque, point 5 | rpm | 0 | 8031.875 |
| REFERENCE_RETARDER_TORQUE | Reference retarder torque | Nm | 0 | 64255 |
| NUMBER_OF_REVERSE_GEAR_RATIOS | Number of reverse gear ratios | num gears | 0 | 125 |
| NUMER_OF_FORWARD_GEAR_RATIOS | Number of forward gear ratios | ratios | 0 | 125 |
| HIGHEST_REVERSE_GEAR_RATIO | Highest reverse gear ratio | value | 0 | 64.255 |
| LOWEST_FORWARD_GEAR_RATIO | Lowest forward gear ratio | % | 0 | 250 |
| ACCELERATOR_PEDAL_AP_POSITION | Accelerator pedal (AP) position | % | 0 | 100 |
| PERCENT_LOAD_AT_CURRENT_SPEED | Percent load at current speed | % | 0 | 125 |
| DRIVERS_DEMAND_ENGINE_PERCENT_TORQUE | Drivers demand engine - percent torque | % Torque | −125 | 125 |
| ACTUAL_ENGINE_PERCENT_TORQUE | Actual Engine - Percent Torque | % Torque | −125 | 125 |
| ENGINE_SPEED | Engine Speed | rpm | 0 | 8031.875 |
| ENGINE_SPEED_AT_IDLE_POINT_1_ENGINE_CONFIGURATION | Engine speed at idle, point 1 (Engine) | rpm | 0 | 8031.875 |
| PERCENT_TORQUE_AT_IDLE_POINT_1_ENGINE_CONFIGURATION | Percent Torque at Idle, Point 1 (Engine Configuration) | % | −125 | 125 |
| ENGINE_SPEED_AT_POINT_2_ENGINE_CONFIGURATION | Engine speed at point 2 (Engine configuration) | rpm | 0 | 8031.875 |
| PERCENT_TORQUE_AT_POINT_2_ENGINE_CONFIGURATION | Percent torque at point 2 (Engine configuration) | % | −125 | 125 |
| ENGINE_SPEED_AT_POINT_3_ENGINE_CONFIGURATION | Engine speed at point 3 (Engine configuration) | rpm | 0 | 8031.875 |
| PERCENT_TORQUE_AT_POINT_3_ENGINE_CONFIGURATION | Percent torque at point 3 (Engine configuraton) | % | −125 | 125 |
| ENGINE_SPEED_AT_POINT_4_ENGINE_CONFIGURATION | Engine speed at point 4 (Engine configuration) | rpm | 0 | 8031.875 |
| PERCENT_TORQUE_AT_POINT_4_ENGINE_CONFIGURATION | Percent torque at point 4 (Engine configuration) | % | −125 | 125 |
| ENGINE_SPEED_AT_POINT_5_ENGINE_CONFIGURATION | Engine speed at point 5 (Engine configuration) | rpm | 0 | 8031.875 |
| PERCENT_TORQUE_AT_POINT_5_ENGINE_CONFIGURATION | Percent torque at point 5 (Engine configuration) | % | −125 | 125 |
| ENGINE_SPEED_AT_HIGH_IDLE_POINT_6_ENGINE_CONFIGURATION | Engine speed at high idle, point 6 (Engine configuration) | rpm | 0 | 8031.875 |
| GAIN_KP_OF_ENDSPEED_GOVERNOR | Gain (KP) of endspeed governor | % | 0 | 50.2 |

TABLE 1-continued

| Data Value ID | Variable Name | Units | Lower Limit | Upper Limit |
|---|---|---|---|---|
| REFERENCE_ENGINE_TORQUE_ENGINE_CONFIGURATION | Reference Engine Torque (Engine configuration) | Nm | 0 | 64255 |
| MAXIMUM_MOMENTARY_ENGINE_OVERRIDE_SPEED_POINT_7_ENGINE_CONFIGURATION | Maximum Momentary Engine Override Speed, Point 7 (Engine configuration) | rpm | 0 | 8031.875 |
| MAXIMUM_MOMENTARY_ENGINE_OVERRIDE_TIME_LIMIT | Maximum momentary engine override time linit | s | 0 | 25 |
| REQUESTED_SPEED_CONTROL_RANGE_LOWER_LIMIT | Requested Speed Control Range Lower Limit | rpm | 0 | 2500 |
| REQUESTED_SPEED_CONTROL_RANGE_UPPER_LIMIT_ENGINE_CONFIGURATION | Requested Speed Control Range Upper Limit (Engine configuration) | rpm | 0 | 2500 |
| REQUESTED_TORQUE_CONTROL_RANGE_LOWER_LIMIT | Requested Torque Control Range Lower Limit | % | −125 | 125 |
| REQUESTED_TORQUE_CONTROL_RANGE_UPPER_LIMIT | Requested Torque Control Range Upper Limit | % | −125 | 125 |
| TOTAL_ENGINE_HOURS | Total Engine Hours | hrs | 0 | 210554060.75 |
| TOTAL_ENGINE_REVOLUTIONS | Total Engine Revolutions | r | 0 | 421108121500 0 |
| SECONDS | Seconds | s | 0 | 59.75 |
| MINUTES | Minutes | minutes | 0 | 59 |
| TOTAL_VEHICLE_HOURS | Total Vehicle Hours | hrs | 0 | 210554060.75 |
| TOTAL_POWER_TAKE_OFF_HOURS | Total Power Takeoff Hours | hrs | 0 | 210554060.75 |
| COMPASS_BEARIN | Compass Bearing | degree | 0 | 502 |
| NAVIGATION_BASED_VEHICLE_SPEED_ | Navigation-Based Vehicle speed | kph | 0 | 251 |
| PITCH | Pitch | % | −200 | 302 |
| ALTITUDE | Altitude | m | −2500 | 5531.875 |
| TRIP_FUEL | Trip Fuel | L | 0 | 2105540608 |
| TOTAL_FUEL_USED | Total Fuel Used | L | 0 | 2105540608 |
| AXLE_LOCATION | Axle Location | val | 0 | 250 |
| AXLE_WEIGHT | Axle Weight | kg | 0 | 32127.5 |
| TRAILER_WEIGHT | Trailer Weight | kg | 0 | 128510 |
| CARGO_WEIGHT | Cargo Weight | kg | 0 | 128510 |
| MAXIMUM_VEHICLE_SPEED_LIMIT | Maximum Vehicle Speed Limit | kph | 0 | 250 |
| CRUISE_CONTROL_HIGH_SET_LIMIT_SPEED | Cruise Control High Set Limit Speed | kph | 0 | 250 |
| CRUISE_CONTROL_LOW_SET_LIMIT-SPEED | Cruise Control Low Set Limit Speed | kph | 0 | 250 |
| ENGINE_COOLANT_TEMPERATURE | Engine Coolant Temperature | Deg C. | −40 | 210 |
| FUEL_TEMPERATURE | Fuel Temperature | Deg C. | −40 | 210 |
| ENGINE_OIL_TEMPERATURE | Engine Oil Temperature | Deg C. | −273 | 1735 |
| TURBO_OIL_TEMPERATURE | Turbo Oil Temperature | Deg C. | −273 | 1735 |
| ENGINE_INTERCOOLER_TEMPERATURE | Engine Intercooler | Deg C. | −40 | 210 |
| FUEL_DELIVERY-PRESSURE | Fuel Delivery Pressure | kPa | 0 | 1000 |
| ENGINE_OIL_LEVEL | Engine Oil Level | % | 0 | 100 |

TABLE 1-continued

| Data Value ID | Variable Name | Units | Lower Limit | Upper Limit |
| --- | --- | --- | --- | --- |
| ENGINE_OIL_PRESSURE | Engine Oil Pressure | kPa | 0 | 1000 |
| CRANKCASE_PRESSURE | Crankcase Pressure | kPa | −250 | 251.99 |
| COOLANT_PRESSURE | Coolant Pressure | kPa | 0 | 500 |
| COOLANT_LEVEL | Coolant Level | % | 0 | 100 |
| POWER_TAKEOFF_OIL_TEMPERATURE | Power Takeoff Oil Temperature | Deg C. | −40 | 210 |
| POWER_TAKEOFF_SPEED | Power Takeoff Speed | rpm | 0 | 8031.875 |
| POWER_TAKEOFF_SET_SPEED | Power Takeoff Set Speed | rpm | 0 | 8031.875 |
| FUEL_RATE | Fuel Rate | L/h | 0 | 3212.75 |
| INSTANTANEOUS_FUEL_ECONOMY | Instantaneous Fuel Economy | km/L | 0 | 125.5 |
| AVERAGE_FUEL-ECONOMY | Average Fuel Economy | km/L | 0 | 125.5 |
| LATITUDE | Latitude | degree | −210 | 211.108122 |
| LONGITUDE | Longitude | degree | −210 | 211.108121 |
| LOCATION | Location | device | 0 | 250 |
| TIRE PRESSURE | Tire Pressure | kPa | 0 | 1000 |
| TIRE_TEMPERATURE | Tire Temperature | Deg C. | −273 | 1735 |
| BAROMETRIC_PRESSURE | Barometric Presure | kPa | 0 | 125 |
| CAB_INTERIOR_TEMPERATURE | Cab Interior Temperature | Deg C. | −273 | 1735 |
| AMBIENT_AIR_TEMPERATURE | Ambient Air Temperature | Deg C. | −273 | 1735 |
| AIR_INLET_TEMPERATURE | Air Inlet Temperature | Deg C. | −40 | 210 |
| ROAD_SURFACE_TEMPERATURE | Road Surface Temperature | Deg C. | −273 | 1735 |
| PARTICULATE_TRAP_INLET_PRESSUR | Particulate Trap Inlet Pressure | kPa | 0 | 125 |
| BOOST_PRESSURE | Boost Pressure | kPa | 0 | 500 |
| INTAKE_MANIFOLD_TEMPERATURE | Intake Manifold Temperature | Deg C. | −40 | 210 |
| AIR_INLET_PRESSURE | Air Inlet Pressure | kPa | 0 | 500 |
| AIR_FILTER_DIFFERENTIAL_PRESSURE | Air Filter Differential Pressure | kPa | 0 | 12.5 |
| EXHAUST_GAS_TEMPERATURE | Exhaust Gas Temperature | Deg C. | −273 | 1735 |
| COOLANT_FILTER_DIFFERENTIAL_PRESSURE | Coolant Filter Differential Presure | kPa | 0 | 125 |
| NET-BATTERY_CURRENT | Net Battery Current | A | −125 | 125 |
| ALTERNATOR_CURRENT | Alternator Current | A | 0 | 250 |
| ALTERNATOR_POTENTIAL_VOLTAGE | Alternator Potential (Voltage) | V | 0 | 3212.75 |
| ELECTRICAL_POTENTIAL_VOLTAGE | Electrical Potential (voltage) | V | 0 | 3212.75 |
| BATTERY_POTENTIAL_VOLTAGE_SWITCHED | Battery Potential (Voltage), Switched | V | 0 | 3212.75 |
| CLUTCH_PRESSUR | Clutch Pressure | kPa | 0 | 4000 |
| TRANSMISSION_OIL_LEVEL | Transmission Oil Level | % | 0 | 100 |
| TRANSMISSION_FILTER_DIFFERENTIAL_PRESSURE | Transmission Filter Differential Pressure | kPa | 0 | 500 |
| TRANSMISSION_OIL_PRESSURE | Transmission Oil Pressure | kPa | 0 | 4000 |
| TRANSMISSION_OIL_TEMPERATURE | Transmission Oil Temperature | Deg C. | −273 | 1735 |
| STEERING_AXLE_TEMPERATURE | Steering Axle Temperature | Deg C. | −40 | 210 |
| DRIVE_AXLE_LOCATION | Drive Axle Location | location | 0 | 250 |
| DRIVE_AXLE_LIFT_ | Drive Axle Lift | kPa | 0 | 1000 |

TABLE 1-continued

| Data Value ID | Variable Name | Units | Lower Limit | Upper Limit |
|---|---|---|---|---|
| AIR_PRESSURE | Air Pressure | | | |
| DRIVE_AXLE_TEMPERATURE | Drive Axle Temperature | Deg C. | −40 | 210 |
| BRAKE_APPLICATION_PRESSURE | Brake Application Pressure | kPa | 0 | 1000 |
| BRAKE_PRIMARY-PRESSURE | Brake Primary Pressure | kPa | 0 | 1000 |
| BRAKE_SECONDARY_PRESSURE | Brake Secondary Pressure | kPa | 0 | 1000 |
| HYDRAULIC_RETARDER_PRESSURE | Hydraulic Retarder | kPa | 0 | 4000 |
| HYDRAULIC_RETARDER_OIL_TEMPERATURE | Hydraulic Retarder Oil Temperature | Deg C. | −40 | 210 |
| WASHER_FLUID_LEVEL | Washer Fluid Level | % | 0 | 100 |
| FUEL_LEVEL | Fuel Level | % | 0 | 100 |
| FUEL_FILTER_DIFFERENTIAL_PRESSURE | Fuel Filter Differential | kPa | 0 | 500 |
| ENGINE_OIL_FILTER_DIFFERENTIAL_PRESSURE | Engine Oil Filter Differential Pressure | kPa | 0 | 125 |
| INJECTION_CONTROL_PRESSURE | Injection Control Pressure | MPa | 0 | 251 |
| BLOWER_BYPASS_VALVE_POSITION | Blower Bypass Valve Position | % | 0 | 100 |
| GAS_SUPPLY_PRESSURE | Gas Supply Pressure | kPa | 0 | 32127.5 |
| AUXILIARY_PUMP_PRESSURE | Auxiliary Pump Pressure | % | 0 | 4000 |
| INJECTOR_METERING_RAIL_PRESSU | Injector Metering Rail Pressure | MPa | 0 | 251 |
| CARGO_AMBIENT_TEMPERATURE | Cargo Ambient Temperature | Deg C. | −273 | 1735 |
| INPUT_SHAFT_SPEED | Input Shaft Speed | rpm | 0 | 8031.875 |
| TRANSMISSION_REQUESTED_RANGE | Transmission Requested Range | no unit | 0 | 64250 |
| TRANSMISSION_CURRENT_RANGE | Transmission Current Range | no unit | 0 | 64250 |
| PERCENT_TORQUE_AT_PEAK_TORQUE_POINT_5 | Percent torque at peak torque, point 5 | % | −125 | 125 |
| HOURS | Hours | hrs | 0 | 23 |
| MONTH | Month | month | 1 | 12 |
| DAY | Day | day | 0.25 | 31.75 |
| YEAR | Year | year | 1985 | 2235 |
| ALTERNATOR_SPEED | Alternator speed | rpm | 0 | 32127.5 |
| SHIFT_FINGER_GEAR_POSITION | Shift finger gear position | % | 0 | 100 |
| SHIFT_FINGER_RAIL_POSITION | Shift finger rail position | % | 0 | 100 |
| TRANSMISSION_SYNCHRONIZER_CLUTCH_VALUE | Transmission synchronizer clutch value | % | 0 | 100 |
| TRANSMISSION_SYNCHRONIZER_BRAKE_VALUE | Transmission synchronizer brake value | % | 0 | 100 |
| HIGH_RESOLUTION_TOTAL_VEHICLE_DISTANCE | High resolution total vehicle distance | m | 0 | 21055406 |
| HIGH_RESOLUTION_TRIP_DISTANCE | High resolution trip distance | m | 0 | 21055406 |
| SERVICE_COMPONENT_IDENTIFICATION | Service component identification | no unit | 0 | 250 |
| SERVICE_DISTANCE | Service distance | km | −160635 | 160640 |
| SERVICE_DELAY_CALENDAR_TIME_BASED | Service delay/calendar time based | week(s) | −125 | 125 |
| SERVICE_DELAY_OPERATIONAL_TIME_BASED | Service delay operational time based | hrs | −32127 | 32128 |

TABLE 1-continued

| Data Value ID | Variable Name | Units | Lower Limit | Upper Limit |
|---|---|---|---|---|
| FRONT_AXLE_SPEED | Front Axle Speed | kph | 0 | 251 |
| RELATIVE_SPEED_FRONT_AXLE_LEFT_WHEEL | Relative speed; front axle, left wheel | kph | −7.8125 | 7.8125 |
| RELATIVE_SPEED_FRONT_AXLE_RIGHT_WHEEL | Relative speed; front axle, right wheel | kph | −7.8125 | 7.8125 |
| RELATIVE_SPEED_REAR_AXLE_1_LEFT_WHEEL | Relative speed; rear axle #1, left wheel | kph | −7.8125 | 7.8125 |
| RELATIVE_SPEED_REAR_AXLE_1_RIGHT_WHEEL | Relative speed; rear axle #1, right wheel | kph | −7.8125 | 7.8125 |
| RELATIVE_SPEED_REAR_AXLE_2_LEFT-WHEEL | Relative speed; rear axle #2, left wheel | kph | −7.8125 | 7.8125 |
| RELATIVE_SPEED_REAR_AXLE_2_RIGHT_WHEEL | Relative speed; rear axle #2, right wheel | kph | −7.8125 | 7.8125 |
| RATED_ENGINE_POWER | Rated Engine Power | kW | 0 | 32127.5 |
| RATED_ENGINE_SPEED | Rated engine speed | rpm | 0 | 8031.875 |
| RPM | RPM | rpm | 0 | 8031.875 |
| ENGINE_RETARDER_SELECTION | Engine reatrder selection | % Torque | 0 | 100 |

Data value bit variables are those variables supported by the software package 100 that represent a single bit of storage, i.e. a logical value. All data values are of one, and only one, of two states, on or off. The definition of the variables in Table 2 includes a programmatic constant name and a description of the variable. Physical storage for any of these data values in the data link package 100 is provided by the VARIANT data type. In all cases, the data type shall be VT_BOOL. Data link clients may choose to assert this within their own code. Note that error indications typcially reflected in Boolean types on the vehicle network are captured in the data status fields returned to clients.

TABLE 2

| Name | Enumeration Name |
|---|---|
| ABS | Anti Lock Brake System On |
| ABS_OFFROAD_SWITCH | ABS Offroad Switch |
| ACCELERATOR_PEDAL_KICKDOWN_SWITCH | Accelerator Pedal Kickdown Switch |
| ACCELERATOR_PEDAL_LOW_IDLE_SWITCH | Accelerator Pedal Low Engine Idle Speed Switch |
| ANTI_LOCK_BRAKING_ABS_ACTIVE | Anti-lock Braking (ABS) Active |
| ASR_BRAKE_CONTROL_ACTIVE | ASR Brake Control Active |
| ASR_HILL_HOLDER_SWITCH | ASR Hill Holder Switch |
| ASR_OFFROAD_SWITCH | ASR Offroad Switch |
| BRAKE_FLUID | Brake Fluid |
| BRAKE_PRESS | Brake Press |
| BRAKE_SWITCH | Brake Switch |
| CENTER_RAIL_INDICATOR | Center rail indicator |
| CENTRAL | Central |
| CENTRAL_FONT | Central front |
| CENTRAL_REAR | Central rear |
| CHECK_ELECT_SYS | Check Elect Sys |
| CHECK_TRANS | Check Trans |
| CLUTCH_ACTUATOR | Clutch Actuator |
| CLUTCH_SWITCH | Clutch Switch |
| COOLENT_LEVEL | Coolent level |
| CRUISE_CONTROL | Cruise Control |
| CRUISE_CONTROL_ACCELERATE_SWITCH | Cruise Control Accelerate Switch |
| CRUISE_CONTROL_ACTIVE | Cruise Control Active |
| CRUISE_CONTROL_COAST_DECELERATE_SWITCH | Cruise Control Coast (Decelerate) Switch |
| CRUISE_CONTROL_ENABLE_SWITCH | Cruise Control Enable Switch |
| CRUISE_CONTROL_RESUME_SWITCH | Cruise Control Resume Switch |
| CRUISE_CONTROL_SET_SWITCH | Cruise Control Set Switch |
| DEFUEL_ACTUATOR | Defuel actuator |
| DISENGAGE_DRIVELINE_REQUEST | Disengage Driveline Request |
| DRIVELINE_ENGAGE | Driveline engaged |
| DRIVER_ALERT_MODE | Driver Alert Mode |
| ENGAGEMENT_INDICATOR | Engagement indicator |

TABLE 2-continued

| Name | Enumeration Name |
|---|---|
| ENGINE_AND_RETARDER_TORQUE_MODE | Engine and Retarder Torque Mode |
| ENGINE_HAS_SHUTDOWN_BY_SYSTEM | Engine has shutdown by system |
| ENGINE_TEST_MODE_SWITCH | Engine Test Mode Switch |
| FORWARD_SWITCH | Forward switch |
| FRONT_AXLE_1 | Front axle 1 |
| FRONT_AXLE_2 | Front axle 2 |
| GEAR_ACTUATOR_1 | Gear actuator #1 |
| GEAR_ACTUATOR_2 | Gear actuator #2 |
| GEAR_SHIFT_INHIBIT_REQUEST | Gear Shift Inhibit Request |
| HIGH_BEAM | High Beam |
| HIGH_RANGE_SENSE | High range sense |
| IDLE_DECREMENT_SWITCH | Idle decrement switch |
| IDLE_INCREMENT_SWITCH | Idle increment switch |
| IDLE_SHUTDOWN_TIMER_FUNCTION | Idle Shutdown Timer Function |
| IDLE_SHUTDOWN_TIMER_OVERRIDE | Idle Shutdown Timer Override |
| INERTIA_BRAKE_ACTUATOR | Inertia brake actuator |
| IO_CHANNEL_1 | IO channel #1 |
| IO_CHANNEL_10 | IO channel #10 |
| IO_CHANNEL_11 | IO channel #11 |
| IO_CHANNEL_12 | IO channel #12 |
| IO_CHANNEL_13 | IO channel #13 |
| IO_CHANNEL_14 | IO channel #14 |
| IO_CHANNEL_15 | IO channel #15 |
| IO_CHANNEL_16 | IO channel #16 |
| IO_CHANNEL_2 | IO channel #2 |
| IO_CHANNEL_3 | IO channel #3 |
| IO_CHANNEL_4 | IO channel #4 |
| IO_CHANNEL_5 | IO channel #5 |
| IO_CHANNEL_6 | IO channel #6 |
| IO_CHANNEL_7 | IO channel #7 |
| IO_CHANNEL_8 | IO channel #8 |
| IO_CHANNEL_9 | IO channel #9 |
| LOCKUP_CLUTCH_ACTUATOR | Lockup clutch actuator |
| LOW_RANGE_SENSE | Low range sense |
| MOMENTARY_ENGINE_OVERSPEED_ENABLE | Momentary Engine Overspeed Enable |
| NEUTRAL_INDICATOR | Neutral indicator |
| NEUTRAL_SWITCH | Neutral switch |
| OVERRIDE_CONTROL_MODE_PRIORITY | Override Control Mode Priority |
| OVERRIDE_CONTROL_MODES | Override Control Modes |
| PARK_BRAKE | Park Brake |
| PARKING_BRAKE_ACTUATOR | Parking Brake Actuator |
| PARKING_BRAKE_SWITCH | Parking Brake Switch |
| PROGRESSIVE_SHIFT_DISABLE | Progressive Shift Disable |
| RAIL_ACTUATOR_1 | Rail actuator #1 |
| RAIL_ACTUATOR_2 | Rail actuator #2 |
| RANGE_HIGH_ACTUATOR | Range high actuator |
| RANGE_LOW_ACTUATOR | Range low actuator |
| REAR_AXLE_1 | Rear axle 1 |
| REAR_AXLE_2 | Rear axle 2 |
| REQUESTED_SPEED_CONTROL_CONDITIONS | Requested Speed Control Conditions |
| RETARDER_ENABLE_BRAKE_ASSIST_SWITCH | Retarder Enable - Brake Assist Switch |
| RETARDER_ENABLE_SHIFT_ASSIST_SWITCH | Retarder Enable - Shift Assist Switch |
| RETARDER_LOCATION | Retarder Location |
| RETARDER TYPE | Retarder Type |
| REVERSE_SWITCH | Reverse switch |
| RIGHT_TURN | Right turn |
| SEAT BELT | Seat Belt |
| SHIFT_IN_PROCESS | Shift in Process |
| SPLITTER_DIRECT_ACTUATOR | Splitter direct actuator |
| SPLITTER_INDIRECT_ACTUATOR | Splitter indirect actuator |
| TORQUE_CONVERTER_LOCKUP_DISABLE_REQUEST | Torque Converter Lockup Disable Request |
| TORQUE_CONVERTER_LOCKUP_ENGAGED | Torque Converter Lockup Engaged |
| TRQACTION_CONTROL | Traction Control |
| TRAILER_ABS | Trailer ABS |
| TRANSMISSION_OUTPUT_RETARDER | Transmission output retarder |
| TWO_SPEED_AXLE_SWITCH | Two speed axle switch |
| WAIT_TO_START | Wait to Start |
| WASH_FLUID_LOW | Wash fluid low |
| WATER_IN_FUEL_INDICATOR | Water in fuel indicator |

Table 3 contains definitions of data link variables that contain enumerations of values supported by the data link software package 100. Included in the definition are a programmatic constant name, a description of the variable.

TABLE 3

| Name | Enumeration Name |
| --- | --- |
| CRUISE_CONTROL_STATES | Cruise Control States |
| ENGINE_AND_RETARDER_TORQUE_MODE | Engine/Retarder Torque Mode |
| IDLE_SHUTDOWN_TIMER_STATE | Engine Idle Shutdown Timer State |

Network classes is one type of COM object used. Network classes is used by software 100 when explicit identification of the class of the underlying physical network is required, e.g. SAE J1939 or SAE J1587. DataValueStatus is used when explicit identification of the status of data communication is required. The values used are "MESSAGE-SUCCESS" which indicates that no exceptions occurred during a given network operation. Occurrance of MESSAGETIMEOUT indicates that a time out period expired during the course of a communication request. DATAVALUENOT-SUPPORTED indicates that a given data value was requested from a remote device, but is not supported by the device. For example, suppose engine speed was requested from an anti-lock brake system (ABS) controller. DATA-VALUERANGEERROR indicates that the data received from a reported remote device was out of range. DATA-VALUEBITERROR can occur of devices reporting boolian (binary) values.

Another COM object is STATETRANSITIONS which is an enumeration used within explicit indication of a change in status is required. Enumerated values for this object include STATECHANGE which indicates that the mechanism for being notified for a particular value is on a state change basis. This means that if a client requests a given data value on a STATECHANGE basis, then the client will only be notified of a data value receipt when the state of the value has changed from what was initially specified. STATECONSTANT indicates that the mechanism for being notified for a particular value is on a continual basis until the state changes. This means that if a client requests a given data value on a STATECONSTANT basis, then the client will periodically be notified of a data value until the state of the value has changed from what was initially specified. Once the state of change is detected, the client will no longer be notified until the value again falls within the specified range.

Error Handling

A set of custom facility error codes that may be generated and returned by the software package 100. Clients can determine, based on the HResult return code of all functions, whether a given function has failed or not. In addition to using the HResult, the client can retrieve additional data, possibly indicating why a particular function failed. For example, if a client invokes EnumerateNetworks 258 without first invoking, on at least an initial occasion, AcquireNetworks 270, an HResult is returned indicating error. The actual error code may be extracted from HResult using the HResult_Facility and HResult_Code macros which are described in Microsoft documentation for the Win32 API. The custom error codes are as follows.

E_NO_NETWORKS_ACQUIRED. No successful network acquistions have occurred during an attempt to perform an enumeration. A successful network acquisition must occur before an enumeration can successfully complete.

E_NETWORK_CONFIGURATION_NOT-FOUND. This results from an attempt to acquire a network that would not resolve into something actually supported by the Software. This can result from the client specifying an instance number which is too high (e.g., not enough physical adaptors are connected to the host remote computer 44 to allow connection to the number of physical networks indicated, or a named network is of a class not supported by the software package 100.

E_DRIVER_INITIALIZATION. An attempt was made to connect to a particular network and there were problems initializing an underlying physical device driver.

E_CANNOT_CLAIM_ADDRESS. The data link software package 100 is configured for the underlying physical network to reside at a particular node address. The error indicates a likely network topology problem.

E_NO_DEVICE_DETECTION_PERFORMED. An attempt was made to enumerate the devices found on a network before successful detection of the network has occurred. A successful network detection is defined as the client software having performed at least one network detection to completion and having issued a DetectionCompleted call on an IDetectDeviceNotify interface 438.

E_NETWORK_NOT_CONNECTED. An attempt was made to perform some network specific operation that depended on the network being in a connected online state. This state is not reached until a successful network connection occurs.

E_DATA_VALUE_ALREADY_BEING_TRANSMITTED. An attempt was made to transmit a data value that is already in the process of transmission to a given remote device. Such attempts are disallowed because of the possibility of creating an inconsistency between what the client thinks it has set as a value for the remote device and what actually arrives at the remote device. Only one function should be allowed to transmit a given value to a given device.

E_UNSUPPORTED_DATA_VALUE_ID. An attempt was made to request or transmit a data value to or from a remote device that was not supported. For example, a client requested an engine speed data value from an ABS system.

Clients that require receipt of asynchronous notifications from the software 100 are required to implement COM objects that support public interfaces. Interfaces implemented by clients depend on the functionality of the notification that is being received. During the course of normal program execution, a given data link client may decide to use the same callback objects to satisfy the notification mechanism variables for some number of data link software requests. In such cases, the data link software does not guarantee that two callback events will not occur at substantially the same point in time. Thus client callback code may need to be reentrant. A case where such is required is where a client registers for raw message traffic from both a J1939 network and a J1587 network, allowing notifications of traffic to overlap.

Conclusion

Software development for vehicle networks is greatly aided by the increase level of abstractness provided by the translation model of the present invention. The flexibility and adaptability of the invention allows for the provision for new protocols as such become available. The system, based on the COM concept is readily extendible, which gives the system room for evolution of the system while maintaining robustness. Generalized function calls handle all data values which can be generated on a motor vehicle network by reference to a database supported by manufacturing codes, while higher level interfaces handle formatting depending on network class type and initiation of communication links through the automated loading of the required drivers.

While the invention is shown in only one of its forms, it is not thus limited but is susceptible to various changes and modifications without departing from the spirit and scope of the invention.

What is claimed is:

1. A method for implementing an application programming interface through a client, comprising the computer implemented steps of:

acquiring models for at least two vehicle network classes from a group including any vehicle class;

responsive to acquisition of the models for the vehicle network classes, detecting a physical network of one of the vehicle network classes and returning an object to the client represented by a pointer to the physical network;

making the client an active member of the physical network;

broadcasting a raw message from the client over the physical network as part of detecting all devices active on the physical network; and providing a database of manufacturer devices to establish a syntax giving meaning to data values transmitted to and received from devices.

2. The method of claim 1, further comprising the computer implemented steps of:

supplying a set of traffic managers allowing detection of and filtering of network messages.

3. The method of claim 2, further comprising the computer implemented steps of:

responsive to a client request, transmitting a data request directed to a device active on the physical network;

responsive to a particular data request from the client, making a synchronous request for the particular data from a device;

obtaining values from devices indicating changes in state;

responsive to a client request, sending specified data values to devices; and responsive to a client request, periodically sending a data value to a device.

4. The method of claim 3, further comprising the computer implemented steps of:

enumerating all physical devices previously detected on the physical network; and responsive to client specified filtering criteria, obtaining network messages corresponding to the filtering criteria.

5. A computer implemented translation system between a client and remote devices connected to a physical network for a vehicle, the system comprising:

a plurality of software objects including:

a network interface incorporating a plurality of functions representing models of a plurality of network from a group including any vehicle class;

a datalink interface responsive to client requests for acquiring a network instance corresponding both to a physical network and to one of the network classes from the network interface; and a remote device interface incorporating a plurality of functions representing a models for physical devices installable on a vehicle, the remote device interface being callable through the network interface for handling messages moving between the client and a physical device.

6. A computer implemented translation system as claimed in claim 5, further comprising a common programming interface supported by the datalink interface.

7. A computer implemented translation system as claimed in claim 6, further comprising:

a device detection interface called from the network interface and which includes a function for indicating to the client that a remote device has been detected in response to a previously commenced device detection operation, and a detection completed function for indicating to the client that a device detection operation has been completed.

8. A computer implemented translation system as claimed in claim 7, further comprising:

a raw message traffic notification interface which issues a call to a client upon receipt of message traffic from the vehicle network.

9. A computer implemented translation system as claimed in claim 8, further comprising:

an interface for notifying a client of receipt of a data value when the client is registered for the data value.

10. A computer implemented translation system as claimed in claim 9, further comprising:

an interface for notifying a client of receipt of a change of state data value for a value associated with a remote device.

11. A computer implemented translation system as claimed in claim 10, further comprising:

an interface for relating to a client about status for changed data values.

12. A computer implemented translation system as claimed in claim 11, wherein the data links interface further comprises:

a function for returning an instance of the network interface and providing unique identification to the instance making the network available to the client;

an enumeration function for determining all networks currently available to the client.

13. A computer implemented translation system as claimed in claim 12, wherein the network interface further includes:

a connection function for establishing communication with a physical network, represented by a network instance to the client;

a device detection function allowing the client to determine which physical devices are connected to the physical network represented by a network instance;

a function for disconnecting the client and the physical network;

an enumerate devices function for returning a set of all physical devices detected on the physical network the last time the device detection function was called;

a function for obtaining a physical address for the physical network;

a function for obtaining an adaptor name for the physical network;

a function for obtaining a baud rate for the physical network;

a function responsive to a client request for returning the time of last operation for the device detection function;

a function for obtaining a network class from a defined set of possible network classes;

a function for returning the number of detected devices at the time of the last operation of the device detection function;

a raw message traffic register function responsive to client requests to obtain messages corresponding to filtering criteria specified by the client in the function;

a function for unregistering a prior registration for raw message traffic using the raw message traffic register function; and a transmit raw message function responsive to client requests.

14. A computer implemented translation system as claimed in claim 13, wherein the remote device interface further includes:

a data value receive register function responsive to client request for broadcasting a data request to a remote device and a way of notifying a client that the requested data is being returned;

a data value receive function responsive to a client request for making a synchronous request of a particular data value from a remote device;

a function for unregistering a request formed using the data value receive register function;

a change of state data value receive register function responsive to user requests for obtaining a change in state status for a particular data value from a particular remote device;

a function for unregistering a registered request for a change of state;

a data value transmit function responsive to client requests for sending a particular data value to a particular remote device;

a registration function for periodic transmission of data values responsive to client requests to send a particular data value to a particular remote device on a periodic basis specified by the client;

an unregistration function for cancelling periodic transmissions of data values;

a function for obtaining remote device addresses;

a function for obtaining a function code for a remote device which then serves as part of the remote device's name; and a function for obtaining an electronic control unit instance for a remote device which then serves as part of the identification of the remote device.

15. A computer implemented translation system as claimed in claim 14, wherein the remote device interface further includes:

a function for obtaining an industry group for a remote device;

a function for obtaining a vehicle system instance code for a remote device;

a function for obtaining a vehicle system code for a remote device; and a function for obtaining a manufacturer code for a remote device, by which a database of remote device properties may be accessed for variables used in calls to the remote device.

16. An application programming interface for a plurality of vehicle network types, comprising:

a client;

a data link interface responsive to the client for acquiring a plurality of network type models from a group including any vehicle class and identifying a physical vehicle network, said identification including the network type model;

a network interface responsive to a request from the data link interface for initiating a communication link between the physical vehicle network and the client which includes identification of the devices connected to the physical vehicle network;

a remote device interface responsive to requests from the network interface for translating data values to and from formats usable by the client and the physical vehicle network; and a data traffic management facility monitoring the network interface, the remote device interface and the physical network to provide indication of message traffic, message identification and transmission.

17. An application programming interface as claimed in claim 16, wherein the network interface implements a plurality of software functions, including:

a function for obtaining a class designation for a network type model;

a function for implementing a network type specific connection between the client and the physical vehicle network in response to a request by the client including the class designation for the physical vehicle network; and a function detecting devices active on the physical vehicle network.

18. An application programming interface as claimed in claim 17, wherein the remote device interface further comprises:

a data value receive register function responsive to client request for broadcasting a data request to a remote device and a way of notifying a client that the requested data is being returned;

a data value receive function responsive to a client request for making a synchronous request of a particular data value from a remote device;

a function for unregistering a request formed using the data value receive register function;

a change of state data value receive register function responsive to user requests for obtaining a change in state status for a particular data value from a particular remote device;

a function for unregistering a registered request for a change of state;

a data value transmit function responsive to client requests for sending a particular data value to a particular remote device;

a registration function for periodic transmission of data values responsive to client requests to send a particular data value to a particular remote device on a periodic basis specified by the client;

an unregistration function for cancelling periodic transmissions of data values;

a function for obtaining remote device addresses;

a function for obtaining a function code for a remote device which then serves as part of the remote device's name; and a function for obtaining a unit instance for a remote device which then serves as part of the identification of the remote device.

19. A application programming interface as claimed in claim 18, wherein the network interface further comprises:

a function for disconnecting the client and the physical vehicle network:

an enumerate devices function for returning a set of all physical devices detected on the physical vehicle network the last time the device detection function was called;

a function for obtaining a physical address for the physical vehicle network;

a function for obtaining an adaptor name for the physical vehicle network;

a function for obtaining a baud rate for the physical vehicle network;

a function responsive to a client request for returning the time of last operation for the device detection function;

a function for obtaining a network class from a defined set of possible network classes;

a function for returning the number of detected devices at the time of the last operation of the device detection function;

a raw message traffic register function responsive to client requests to obtain messages corresponding to filtering criteria specified by the client in the function;

a function for unregistering a prior registration for raw message traffic using the raw message traffic register function; and a transmit raw message function responsive to client requests.

20. An application programming interface comprising:

a host computer on which the application programming interface is installed;

a hardware interface allowing attachment of the host computer to a motor vehicle network from a group including any vehicle class;

a software module for determining the motor vehicle network class;

a software module for registering the host computer as a client on the motor vehicle network;

a software module a for detecting all active devices attached to the motor vehicle network; and a software database including parameters for the detected devices accessible to the host computer.

21. An application programming interface, for execution on a temporary client of one of a plurality of motor vehicle networks of diverse types, the application programming interface comprising:

a plurality of high level interfaces representing a common abstraction through models of a plurality of motor vehicle networks of diverse types from a group including any vehicle class;

a software database accessible through the high level interfaces specifying meaning for values transmitted to and obtained from physical devices attached to the motor vehicle network; and a plurality of component object module functions completed by reference to the database.

* * * * *